United States Patent [19]

Musiel et al.

[11] 4,412,668

[45] Nov. 1, 1983

[54] APPARATUS FOR ORIENTING HEAVY MOLD BASES

[75] Inventors: D. James Musiel, Racine; James E. Buhler, Waterford, both of Wis.

[73] Assignee: S. C. Johnson & Son, Inc., Racine, Wis.

[21] Appl. No.: 204,445

[22] Filed: Nov. 6, 1980

[51] Int. Cl.³ ............................................. A47B 91/00
[52] U.S. Cl. .................................... 248/346; 248/143; 248/208
[58] Field of Search ............... 248/346, 139, 133, 143; 249/95, 137, 139; 269/208, 152; 108/54.1

[56] References Cited

U.S. PATENT DOCUMENTS

| | | | |
|---|---|---|---|
| 1,452,665 | 4/1923 | Tindall | 249/137 |
| 1,479,209 | 1/1924 | Topp | 269/208 X |
| 1,581,138 | 4/1926 | O'Loughlin | 269/208 |
| 1,704,054 | 3/1929 | Miller | 248/143 |
| 2,942,827 | 6/1960 | Edson | 108/54.1 |
| 3,938,685 | 2/1976 | Walchek | 249/139 X |

FOREIGN PATENT DOCUMENTS

| | | | |
|---|---|---|---|
| 234203 | 6/1961 | Australia | 248/143 |
| 67661 | 9/1948 | Denmark | 248/139 |
| 631671 | 11/1949 | United Kingdom | 248/133 |

Primary Examiner—Ramon S. Britts
Assistant Examiner—Sarah A. Lechok

[57] ABSTRACT

Apparatus for orienting heavy mold bases and the like, including a pair of rockers connected together in spaced align relation and having upper planar support surfaces terminated at one end by a fixed abutment and at the other by an adjustable clamp. The curved surfaces of the rockers have a curvature of shorter radius at points near the abutments than at points near the clamping devices. The curved surface, abutment and clamping device of each rocker are arranged such that the center of gravity of a heavy mold base is normally slightly off-center toward the abutment end of the rockers.

11 Claims, 4 Drawing Figures

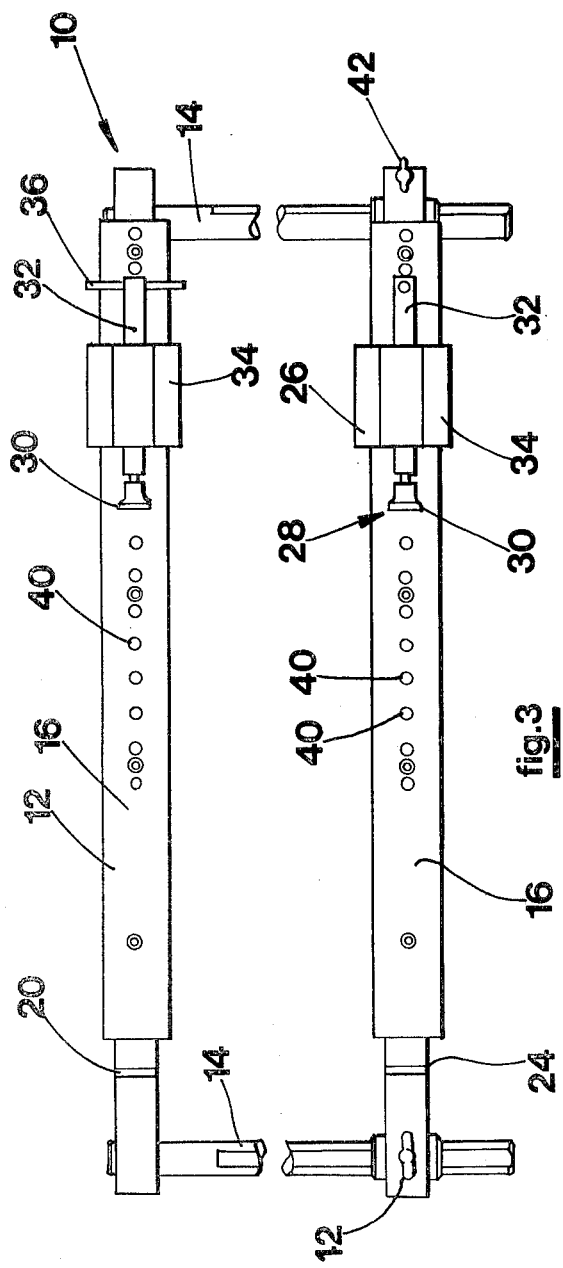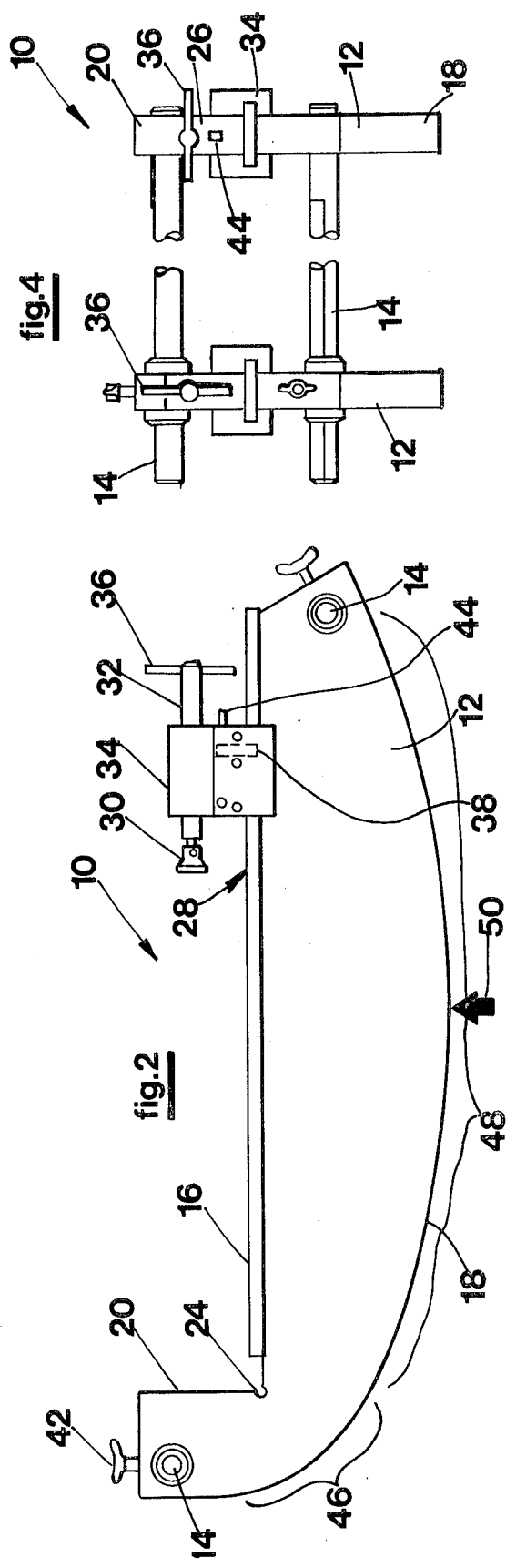

APPARATUS FOR ORIENTING HEAVY MOLD BASES

This invention relates to devices for supporting and orienting compact heavy machinery and in particular to devices for supporting and orienting heavy mold bases.

BACKGROUND OF THE INVENTION

Mold bases of the type used in injection molding and the like are, for all practical purposes, large solid blocks of steel or other heavy metals. The manipulation of such mold bases when molds have to be changed or adjusted or otherwise operated on away from the machinery on which they are mounted for use is a difficult procedure which is dangerous for the workmen involved. Because of their immense weight, the mold bases pose a substantial threat to workmen. Movements and manipulations which would be simple for much lighter equipment are complicated and dangerous for heavy mold bases. Even a simple movement, such as turning the mold base 90° from one side to an adjacent side is often considered a major operation.

Such heavy mold bases have been moved using crude procedures involving the manipulation of overhead cranes and large timbers which are used to support the mold bases on a work table. These procedures are unsatisfactory since they require excessive balancing, support shifting and a high degree of coordination between the operator of a overhead crane and those workmen pushing the mold base and manipulating the support timbers or the like.

In response to this problem, complex equipment has been developed for supporting and turning heavy mold bases. However, the complexity and high cost of such devices are major negative factors preventing widespread use of such equipment.

BRIEF DESCRIPTION OF THE INVENTION

This invention provides apparatus for orienting heavy mold bases and the like which overcomes the problems mentioned above. The apparatus of this invention includes a pair of rockers connected together in spaced aligned relation. The rockers have an upper planar support surface terminated at one end by a fixed abutment and at the other end by an adjustable clamp means used to clamp the mold base against the abutment.

The curved surfaces of the rockers have a curvature with a shorter radius at points near the abutments than at points near the clamping devices. This shorter radius allows the mold base to be easily pivoted 90° without swinging it high above the support table. The curved surfaces preferably include a minor portion near the abutment and an adjacent major portion forming the remainder of the rocker length, the major portion having a radius at least four times, and most preferably at least five times, as long as the radius of the minor portion.

The curved surface, abutment, and clamping means of each rocker are arranged such that the tangent point of the line which is both parallel to the support surface and tangent to the curved surface is closer to the adjustable end point of the support surface than to the fixed end point regardless of the position of the clamping means. This arrangement normally places the center of gravity of a heavy mold base mounted on the apparatus slightly off-center toward the abutment end of the device. Such off-center condition minimizes the force needed to turn the mold base 90°; such turning may easily be accomplished by rocking the entire structure toward the abutment end of the curved surfaces.

Preferred embodiments of the invention include means to adjust the spacing of the rockers, such as thumb screws extending through the rockers to frictionally engage bars which interconnect the rockers. Such bars extend slidably through at least one of the rockers to allow such adjustment of the spacing between the two rockers. Highly preferred embodiments also include devices on the clamps allowing major stepped adjustment in the position of the clamps on the rockers. Thus, the orienting apparatus of this invention can be quickly adjusted to accept mold bases of widely varying sizes.

OBJECTS OF THE INVENTION

A major object of this invention is to overcome certain problems associated with the moving and orienting of heavy mold bases which have been removed from the equipment on which they are used.

Another object of this invention is to provide a device for orienting heavy mold bases which minimizes the danger and inconvenience associated with movement of mold bases.

Another object of this invention is to provide a device for orienting heavy mold bases which is simple and inexpensive in construction.

Yet another object of this invention is to provide a device for orienting heavy mold bases which is adjustable to accommodate mold bases of widely varying dimensions.

Still another object of this invention is to provide apparatus for orienting heavy mold bases which reduces the need for careful balancing and coordination of movements in turning and orienting operations.

These and other objects of the invention will be apparent from the following descriptions and the drawings of preferred embodiments wherein:

BRIEF DESCRIPTION OF THE DRAWINGS

FIG. 2 is a front elevation of the apparatus of FIG. 1.

FIG. 3 is a fragmentary top plan view of FIG. 2.

FIG. 4 is a right side elevation of FIG. 2.

DESCRIPTION OF PREFERRED EMBODIMENTS

Figure 1:
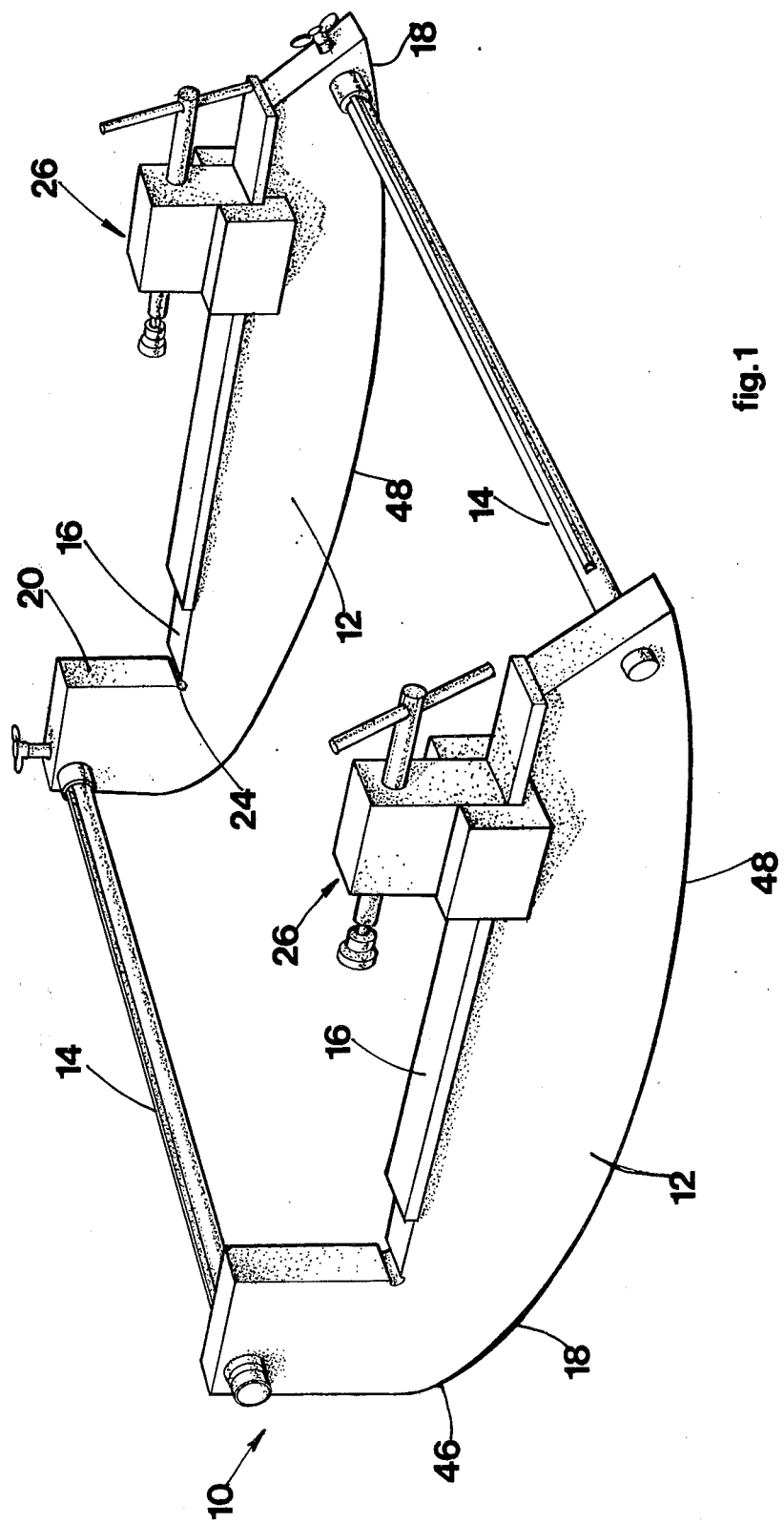
FIG. 1 is a perspective view of the mold base orienting apparatus of this invention.

The figures illustrate a preferred mold orienting device 10 in accordance with this invention. Mold orienting device 10 includes a pair of similar rockers 12 interconnected and held in spaced aligned relationship by support bars 14. Rockers 12 have upper substantially planar support surfaces 16. When mold orienting device 10 is in use, a heavy mold base rests on the two support surfaces 16 of rockers 12. Rockers 12 also include lower curved surfaces 18 which typically are in contact with a work table or other flat work surface.

Rockers 12 each include an abutment 20 formed at one end thereof. The abutments 20 are upwardly extending structures defined on one side by the end of curved surfaces 18 and forming flat abutment surfaces 22 on their opposite sides which define fixed end points 24 at one end of support surfaces 16.

Clamping devices 26 are mounted on each rocker at the opposite end of the support surface. Clamping devices 26 define adjustable end points 28 on upper support surfaces 16. Heavy mold bases are clamped between abutment 20 and clamping devices 26. Clamping devices 26 include pivotably mounted clamp buttons 30 at the distal ends of clamp rods 32. Clamp rods 32 are threaded through clamp blocks 34. Screw handles 36, at the opposite end of clamp rods 32, allow easy turning of clamp rods 32 to allow tightening of the clamps for secure clamping of heavy mold bases on mold orienting device 10. As apparent, therefore, the support surface 16 extends between abutment 20 and clamping device or means 26. The clamping means is movable along the support surface 16 to vary the effective length of the support surface.

Each of the clamping devices 36 includes a spring loaded lock pin 38 protruding from its lower surface in position to engage one of several stop-holes 40 which are spaced along upper support surfaces 16. Lock pins 38 and stop-holes 40 provide a means for major stepped adjustment in the position of clamping devices 26 on rockers 12. Attached to each lock pin 38 is a lever 44 which allows an operator to move the lock pin out of a stop-hole 40 so the clamping device 26 can be moved to another position on its rocker 12. After each clamping device 26 has been moved to the appropriate location on its rocker, clamp rods 32 can be turned to allow tight clamping of a mold base against abutments 20.

Thumb screws 42 extend through one of the rockers 12 to secure support bars 14 from sliding adjustment within such rocker. To adjust the spacing of rockers 14, thumb screws 42 are loosened and rockers 12 are pushed together or spread apart to whatever extent required for the particular mold base to be mounted. In the embodiment shown, the support bars 14 may be slideably adjusted with respect to only one of the rockers 12 and are fixed permanently to the other rocker. In an alternative arrangement, both of the rockers 12 could be slideably attached to the support bars 14.

The curved surface 18 of each of the rockers 12 has a curvature with a shorter radius at points near abutment 20 than at points remote therefrom. This curvature is important to operation of mold turning device 10 of this invention. Each curved surface 18 includes a minor portion 46 near abutment 20 and an adjacent major portion 48 forming the remainder of the rocker length. Major portion 48 preferably has a radius of curvature at least four times, and most preferably at least five times, as long as the radius of curvature of minor portion 46.

Curved surface 18, abutment 20, and clamping device 26 of each rocker 12 are arranged such that the tangent point (see arrow 50) of the line which is both parallel to support surface 16 and tangent to curved surface 18 is closer to adjustable end point 28 than to fixed end point 24. This arrangement normally places the center of gravity of a heavy mold base which is mounted on orienting device 10 slightly off-center toward the abutment end of the device.

The various parts and elements of the apparatus of this invention are preferably made of machine steel or the like. Appropriate materials would be apparent to those skilled in the art who are familiar with this invention.

While in the foregoing specification, this invention has been described in relation to certain preferred embodiments and many details have been set forth for purpose of illustration, it will be apparent to those skilled in the art that the invention is susceptible to additional embodiments and that certain of the details described herein can be varied considerably without departing from the basic principles of the invention.

We claim:

1. Apparatus for orienting heavy mold bases of varying sizes comprising:
   a pair of similar rockers, each having a lower curved surface, an upper substantially planar support surface, and an abutment defining a fixed end point at one end of the support surface, the curve surface having a shorter radius at points near the abutment than at points remote therefrom;
   means interconnecting the rockers in spaced, aligned relation;
   means on each rocker at the opposite end of the support surface for clamping a mold base against the abutment, the clamping means defining an adjustable end point on the support surface; and
   the curved surface, abutment, and clamping means of each rocker being arranged such that the tangent point of the line which is parallel to the support surface and tangent to the curved surface is closer to the adjustable end point than to the fixed end point for any adjustment of the clamping means, said support surface extending between said abutment and said clamping means, said clamping means movable along said support surface to vary the effective length of said support surface whereby the said apparatus when carrying a mold base will in the absence of restraining means tip said mold base contained on said planar support surface in the direction of said abutment to lay said mold in a position for storage or maintenance.

2. The apparatus of claim 1 further comprising means to adjust the spacing of the rockers.

3. The apparatus of claim 1 wherein the clamping means include means for major stepped adjustment of position on the rockers.

4. The apparatus of claim 1 wherein each curved surface comprises a minor portion near the abutment having a first radius and an adjacent major portion having a second radius at least four times as long as the first radius.

5. The apparatus of claim 4 wherein the second radius at least five times as long as the first radius.

6. The apparatus of claim 4 further comprising means to adjust the spacing of the rockers.

7. The apparatus of claim 4 wherein the clamping means includes means for major stepped adjustment of position on the rockers.

8. The apparatus of claim 6 wherein the clamping means include means for major stepped adjustment of position on the rockers.

9. The apparatus of claim 5 further comprising means to adjust the spacing of the rockers.

10. The apparatus of claim 5 wherein the clamping means include means for major stepped adjustment of position on the rockers.

11. The apparatus of claim 9 wherein the clamping means include means for major stepped adjustment of position on the rockers.

* * * * *